Feb. 22, 1927. 1,618,722
C. A. PARSONS ET AL
CONDENSING STEAM POWER PLANT
Filed Oct. 21, 1925

INVENTORS:
CHARLES A. PARSONS,
STANLEY S. COOK

Patented Feb. 22, 1927.

1,618,722

UNITED STATES PATENT OFFICE.

CHARLES ALGERNON PARSONS AND STANLEY SMITH COOK, OF NEWCASTLE-ON-TYNE, ENGLAND; SAID COOK ASSIGNOR TO SAID PARSONS.

CONDENSING-STEAM-POWER PLANT.

Application filed October 21, 1925, Serial No. 63,922, and in Great Britain December 2, 1924.

This invention relates to condensing steam power plants.

In such plants, particularly turbine plants, the eduction pipes or passages are often of such a considerable cross section that it is difficult to provide adequate accommodation for controlling valves and operating gear, and a main object of the present invention is to provide an improved plant of the kind indicated in which such valves and their accessories are arranged in a highly compact form.

With such an object, the invention consists in the combination of elements hereinafter described and particularly pointed out in the claims.

Referring to the accompanying drawings:—

Figure 1:
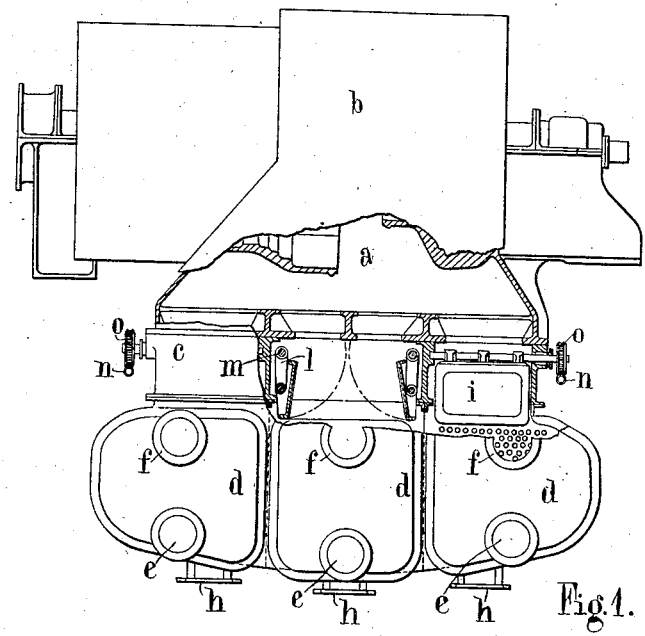

Figure 1 shows an elevation of a turbine plant in which the condenser is divided into three sections contained within a common casing.

Figure 3:
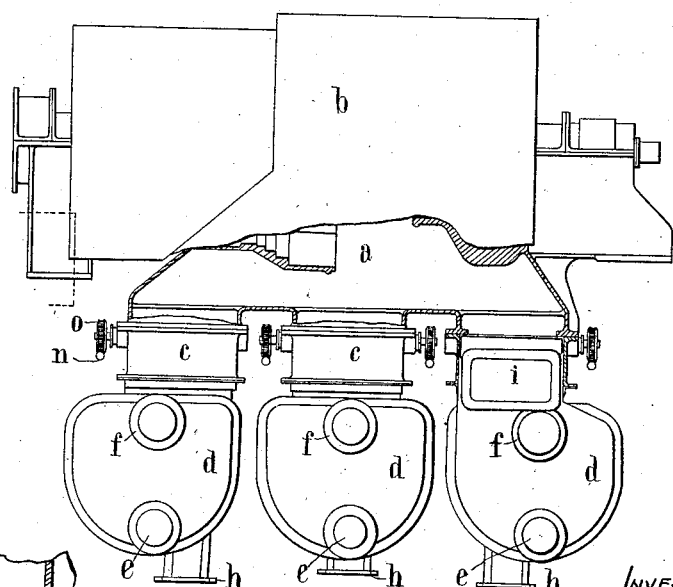
Figure 2:
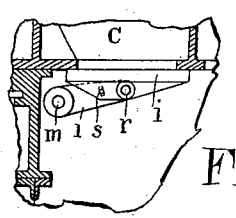

Figure 2 showing in section to an enlarged scale the flap-valve assembly associated with the centre section of Figure 1, while Figure 3 shows in elevation a modified form in which the three condenser sections are separate structures.

The same reference symbols are used in the different figures to denote corresponding parts.

In carrying the invention into effect according to one form applied to a marine turbine plant (see Figures 1 and 2) the main exhaust, $a$, from each low-pressure turbine, $b$, is provided with three separate branches or outlets, $c$, each leading to separate sections, $d$, of the condenser plant formed as a single structure. Each condenser section is provided with the usual inlet, $e$, and outlet, $f$, for the circulating water and also with an air-pump connection, $h$.

Suitable means are provided for isolating each condenser section, $d$, from the low-pressure turbine exhaust, such means taking the form of one or more flap valves, $i$, provided with rubber packing means, $k$, and pivotally mounted on a lever or levers, $l$, on a shaft, $m$, operated by external actuating mechanism such as a worm, $n$, and worm wheel, $o$.

In Figure 1, two such flap valves are shown mounted on parallel axes and each controlling one-half or thereabouts of the aggregate outlet area concerned.

Such flap valves are preferably mounted with a certain degree of freedom on their levers, $l$, as indicated by the clearance shown at $r$ in Figure 2, so that they may tilt to the necessary extent and accommodate themselves to their respective seats. To limit the amount of possible freedom, a pin, $s$, is fixed to the back of each valve, $i$, and projects into a short curved slot in the corresponding lever, $l$.

If salt or leakage is detected and localized, the particular section of the condenser where it occurs may be immediately shut off and the defect remedied, the plant meanwhile carrying on with the remaining sections without any serious interference during the period of repair.

Or again, a section or sections of the condensing plant could be put out of action should it be necessary to operate at reduced powers for a considerable period.

As a constructional measure, instead of the sections being formed as a single structure as described above, each section may have a separate shell and water boxes as indicated in Figure 3.

In some cases more than three condenser sections may be provided for normal working.

Having now described our invention, what we claim as new and desire to secure by Letters Patent is:—

1. The combination of a steam engine, a plurality of condenser sections, a plurality of exhaust passages connecting said engine with said sections and valves for separately controlling said exhaust passages and disposed therewithin both in the closed and open positions.

2. The combination of a steam engine, condensing means therefor, an exhaust passage connecting said engine with said condensing means and a pair of flap valves disposed within said passage and each controlling one half the cross-sectional area thereof.

3. The combination of a steam engine, condensing means therefor, an exhaust passage connecting said engine with said condensing means, a pair of flap valves oppositely disposed within said passage, and means disposed externally of said passage for actuating said flap valves.

4. The combination of a steam engine, condensing means therefor, an exhaust passage connecting said engine with said condensing means and formed with a valve seating; hinged valve means disposed within said passage and means for locating said valve means on said seating, said valve means having a certain amount of play in relation to said locating means.

5. The combination of a steam engine, condensing means therefor, an exhaust passage connecting said engine with said condensing means, valve means disposed within said passage, means for actuating said valve means, said valve means having a certain amount of play in relation to said actuating means and means for limiting the amount of said play.

6. The combination of a steam engine, condensing means therefor, an exhaust passage connecting said engine with said condensing means and valve means for controlling said exhaust passage, said valve means being disposed within said passage both in the closed and open positions.

7. The combination of a steam engine, a plurality of functionally separate condenser sections enclosed in a single casing, a plurality of exhaust passages respectively connecting said engine with said sections, one passage to one section; and valve means for independently controlling each of said exhaust passages, said valve means being disposed therewithin both in the closed and open positions and means disposed externally of said passages for actuating said valve means.

8. The combination of a steam engine, an exhaust passage connecting said engine with said condensing means; valve means pivotally mounted within said passage and means disposed externally of said passage for actuating said valve means.

In testimony whereof we have signed our names to this specification.

CHARLES ALGERNON PARSONS.
STANLEY SMITH COOK.